United States Patent
Ng et al.

(10) Patent No.: US 10,866,895 B2
(45) Date of Patent: Dec. 15, 2020

(54) STEERING TAG SUPPORT IN VIRTUALIZED ENVIRONMENTS

(71) Applicants: ADVANCED MICRO DEVICES, INC., Santa Clara, CA (US); ATI TECHNOLOGIES ULC, Markham (CA)

(72) Inventors: Philip Ng, Markham (CA); Nippon Harshadk Raval, Markham (CA); Francisco L. Duran, Austin, TX (US)

(73) Assignees: ADVANCED MICRO DEVICES, INC., Santa Clara, CA (US); ATI TECHNOLOGIES ULC, Markham (CA)

( * ) Notice: Subject to any disclaimer, the term of this patent is extended or adjusted under 35 U.S.C. 154(b) by 0 days.

(21) Appl. No.: 16/223,838

(22) Filed: Dec. 18, 2018

(65) Prior Publication Data
US 2020/0192802 A1   Jun. 18, 2020

(51) Int. Cl.
| G06F 12/00 | (2006.01) |
| G06F 12/0846 | (2016.01) |
| G06F 12/0815 | (2016.01) |
| G06F 12/1027 | (2016.01) |
| G06F 9/455 | (2018.01) |

(52) U.S. Cl.
CPC ...... *G06F 12/0846* (2013.01); *G06F 9/45558* (2013.01); *G06F 12/0815* (2013.01); *G06F 12/1027* (2013.01); *G06F 2009/45583* (2013.01)

(58) Field of Classification Search
None
See application file for complete search history.

(56) References Cited

U.S. PATENT DOCUMENTS

| 7,617,376 B2* | 11/2009 | Chadalapaka ...... G06F 12/1081 711/153 |
| 2004/0193832 A1* | 9/2004 | Garcia ................ G06F 12/1072 711/202 |
| 2009/0157978 A1 | 6/2009 | Gregg et al. |
| 2013/0173834 A1 | 7/2013 | Glaser et al. |
| 2018/0089115 A1 | 3/2018 | Schmisseur et al. |
| 2020/0004690 A1* | 1/2020 | Mathew ................ G06F 3/0683 |

OTHER PUBLICATIONS

Jackson, "Overview of Chagnes to PCI Express 3.0", MINDSHARE, 4 pages.
"TLP Processing Hints", PCI-SIG Engineering Change Notice, PCI-SIG, Sep. 11, 2008, 16 pages.
Wagh, "PCI-Express 3.0 Technology: Device Architecture Optimizations on Intel Platforms", TCIS006, Intel Developer Forum (IDF), Jul. 27, 2009, 33 pages.

* cited by examiner

*Primary Examiner* — Midys Rojas

(57) ABSTRACT

A method of managing memory access includes receiving, at an input output memory management unit, a memory access request from a device. The memory access request includes a virtual steering tag associate associated with a virtual machine. The method further includes translating the virtual steering tag to a physical steering tag directing memory access of a cache memory associated with a processor core of a plurality of processor cores. The virtual machine is implemented on the processor core. The method also includes accessing the cache memory to implement the memory access request.

20 Claims, 16 Drawing Sheets

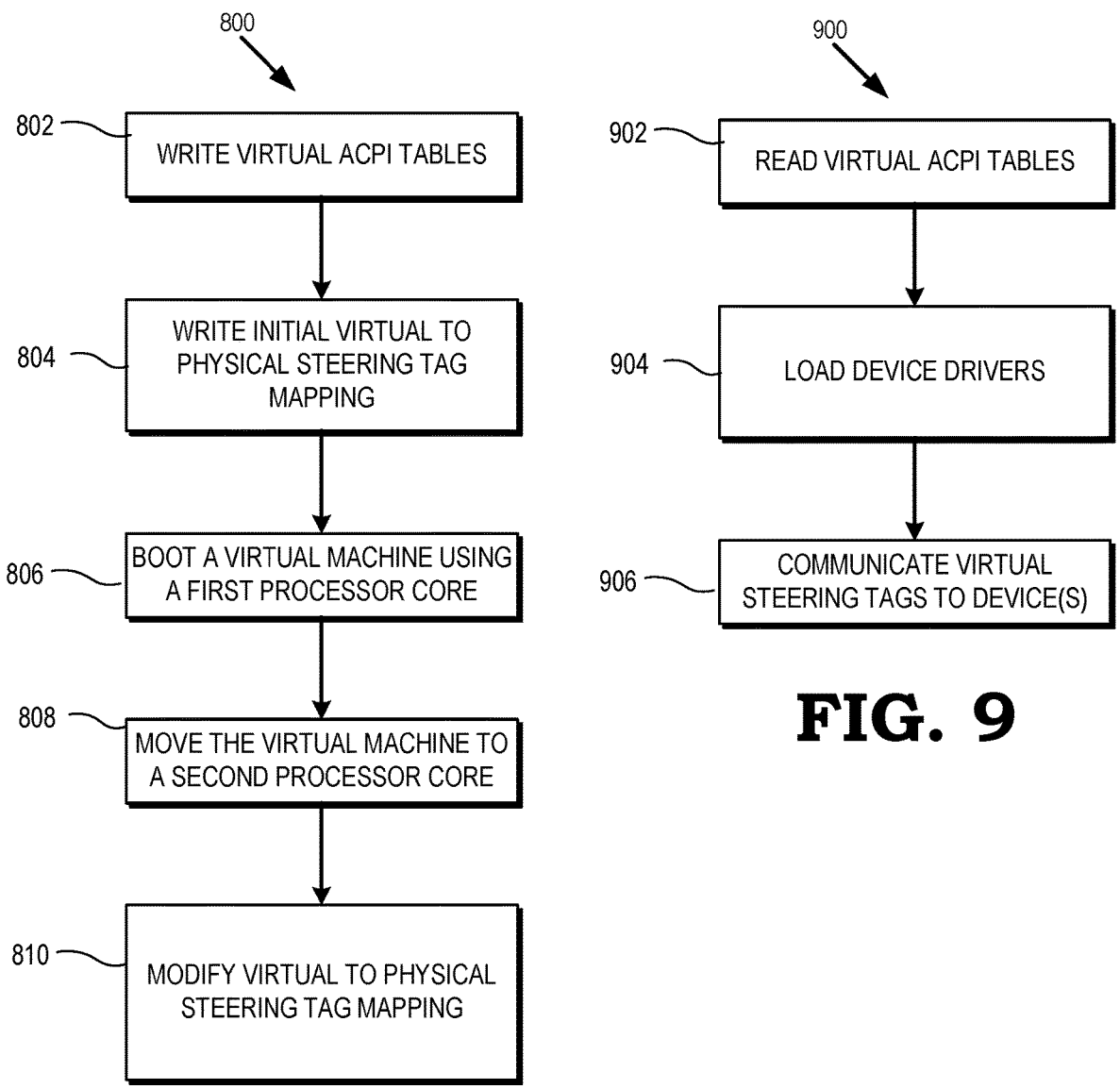

STEERING TAG SUPPORT IN VIRTUALIZED ENVIRONMENTS

BACKGROUND

In an increasingly data-driven economy, data processing and server systems are in high demand. With this high demand, efficient processing of data received via network interfaces is of greater interest. To improve processing efficiency, manufacturers have developed increasing complex multi-core processors and multi-processor systems. To further improve efficiencies, such systems provide virtual environments in which virtual machines are instantiated to allow separate processing of tasks and isolation of processes requested by different entities. In such environments, multiple requests from multiple entities can be processed simultaneously with little interference or delay.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

FIG. 8 is a flow diagram of a method of processing memory access request at the processing system of FIGS. 1-3.

FIG. 9 is a flow diagram of a method of processing memory access request at the processing system of FIGS. 1-3.

DETAILED DESCRIPTION

Figure 1:
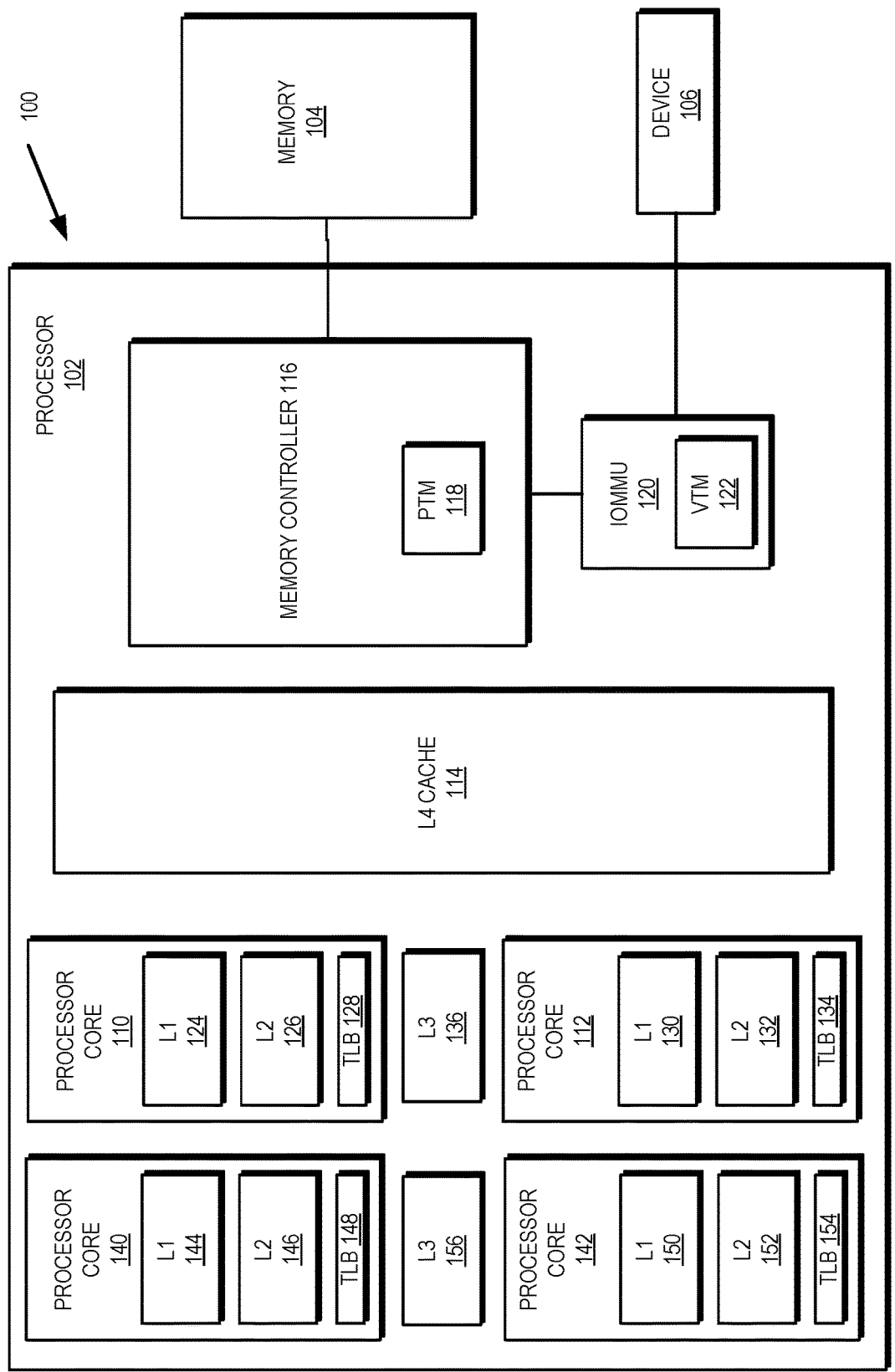
FIG. 1 is a block diagram of a processing system utilizing virtualized steering tags.

FIGS. 1-18 illustrate techniques for incorporating virtual steering tags into memory access requests, such as cache injection memory access requests, to isolate physical resources of a processing system from virtual machines (VMs) executing at the processing system. To illustrate, a system for managing memory access in a virtual environment includes a processor, a memory controller, an input-output memory management unit (IOMMU), and a plurality of processor cores. Each of the processor cores includes a dedicated lower-level cache. The processor can further include higher-level cache accessible by each of the multiple processor cores. The memory controller is in communication with a memory. The input-output memory management unit (IOMMU) can be in communication with devices, such as an input-output device. In some embodiments, the IOMMU communicates with devices in accordance with a serial bus standard, such as the Peripheral Component Interconnect Express (PCIe) serial bus standard. The processor further includes a physical tag map for mapping a physical steering tag to a physical resource, such as lower-level cache associated with a processing core. The IOMMU further includes a virtual tag map which includes entries associating a virtual steering tag with a physical steering tag.

In some embodiments, the IOMMU receives a memory access request, such as a cache injection memory access request, including a virtual steering tag. Utilizing the virtual tag map, the IOMMU translates the virtual steering tag of the memory access request to a physical steering tag and provides the physical steering tag and memory access request to the memory controller. The memory access request can further include a virtual address that can be translated orthogonal to the mapping of the virtual steering tag. The memory controller utilizes the physical steering tag to identify which resource, such as lower-level cache memory, is being targeted by the memory access request. For example, the memory controller can access a physical tag map to map the physical steering tag to a physical resource. In an example, the physical resource can be a lower-level cache dedicated to a processor core of the multiple processor cores.

In a system in which processing resources are allocated to virtual machines by a hypervisor can change at the direction of the hypervisor, the hypervisor can populate the virtual tag map based on the physical resource being utilized by the virtual machine. For example, the hypervisor can allocate a processor core to a virtual machine and record entries in the virtual tag map associating a virtual steering tag to a physical steering tag pointing to a resource associated with the processor core. The virtual machine can be assigned or allocated to a different processor core. Optionally, the virtual machine can be implemented by a single processor core or more than one processor cores in parallel. The virtual tag map can be updated to associate the virtual steering tag with a different physical steering tag pointing to a resource associated with the newly allocated or assigned processor core. As such, a change in the physical resources implementing a virtual machine is transparent to the virtual machine and devices or virtual functions implemented on the devices that interact with the virtual machine.

FIG. 1 illustrates a processing system 100 that provides for managing memory access requests from devices in accordance with some embodiments. The processing system 100 includes a processor 102 and a memory 104. The processing system 100 can be incorporated in any of a variety of electronic devices, such as a server, personal computer, tablet, set top box, gaming system, and the like. The processor 102 is generally configured to execute sets of instructions (e.g., computer programs) that manipulate the circuitry of the processor 102 to carry out defined tasks.

The memory 104 facilitates the execution of these tasks by storing data and instructions used by the processor 102. The memory 104 can be random access memory (RAM), non-volatile memory such as flash memory or a hard disk drive (HDD), and the like, or a combination thereof. The processing system 100 also includes a device 106, such as a physical input/output (I/O) device. The device 106 can be, for example, a network interface card (NIC), a host bus adapter (HBA), or the like.

The processor 102 also includes processor cores 110, 112, 140 and 142, a shared cache 114 (e.g., L4 cache), and a memory controller (e.g., a northbridge) 116. The processor cores 110, 112, 140 and 142 are processing units that individually and concurrently execute instructions. In some embodiments, each of the processor cores 110, 112, 140, and 142 includes an individual instruction pipeline that fetches instructions, decodes the fetched instructions into corresponding operations and, using the resources of the processing system 100, executes various operations. While FIG. 1 illustrates a processor 102 with four processor cores 110, 112, 140, and 142, the processor 102 can have more or can have less than four processor cores. Each of the processor cores 110, 112, 140, and 142 has low level cache dedicated to the processor core. For example, the processor core 110 has a Level 1 cache 124 and a Level 2 cache 126. The processor core 110 can also include a translation lookaside buffer 128. Similarly, the processor core 112 has associated Level 1 cache 130 and Level 2 cache 132. The processor core 112 can also include a translation lookaside buffer 134. In a further example, the processor core 140 has a Level 1 cache 144 and a Level 2 cache 146. The processor core 140 can also include a translation lookaside buffer 148. In another example, the processor core 142 has a Level 1 cache 150 and a Level 2 cache 152. The processor core 142 can also include a translation lookaside buffer 154. The processor 102 can further include cache memory shared by pairs of processors. For example, processor core 110 and processor core 112 can share an L3 cache memory 136, and processor core 140 and processor core 142 can share an L3 cache memory 156.

The processor 102 also includes an input/output memory management unit (IOMMU) 120 that is used to connect devices (such as the device 106 shown in FIG. 1) to the memory controller 116. In some embodiments, the IOMMU 120 communicates with device 106 using a serial bus. The serial bus can comply with a bus standard, such as the Peripheral Component Interconnect Express (PCIe) serial bus standard. The memory controller 116 provides an interface for the device 106 to communicate with the memory 104 or with one or more levels of cache memory. The IOMMU 120 receives memory access requests (e.g., direct memory access requests, such as a cache injection memory access request) from the device 106 and controls provision of those requests to the memory 104 or to cache memory via memory controller 116. The processor 102, for example, at the memory controller 116, includes a physical tag map 118 to map a physical steering tag received from the IOMMU 120 into a physical resource targeted by an associated memory access request, such as a cache injection memory access request. In addition, the memory controller 116 receives responses to memory access requests from the memory 104 or cache memory and controls provision of the responses to the device 106.

The cache injection memory access request can utilize steering tags to target processor resources, such as lower level cache dedicated to a processor core, cache shared between a subset of processor cores, or a share cache. For example, the steering tag can target an L1 cache 124 or L2 cache 126 accessible by processor core 110, an L3 cache 136 accessible to processor cores 110 and 112, or an L4 cache 114 accessible to processor cores 110, 112, 140, or 142. Accordingly, to facilitate efficient execution of memory access requests, the IOMMU 120 accesses a virtual tag map to translate virtual steering tags received in a memory access request to physical steering tag mapped to a physical resource. In response to receiving a memory access request from the device 106, the IOMMU 120 identifies a virtual steering tag and translates the virtual steering tag with the virtual tag map 122. The virtual tag map 122 can be stored in system memory 104 and portions may be cached at the IOMMU 120. Alternatively, the virtual tag map 122 can be cached at the IOMMU 120. The IOMMU 120 provides the memory access request and physical steering tag to the memory controller 116. The memory controller 116 translates the physical steering tag to a physical resource targeted by the memory access request, such as lower-level cache targeted by a cache injection memory access request. In an example, the memory access request targets a low-level cache dedicated to a processor core. In such an example, an address associated with the request can be translated by a translation lookaside buffer, and the cache injection memory access executed.

In some embodiments, the device 106 employs the memory controller 116 to access information in the memory 104 or in cache memory through direct memory access (DMA) requests by initiating a memory access request containing a virtual steering tag and a virtual address sent to the IOMMU 120. The IOMMU 120 can perform steering tag remapping between a virtual steering tag and a physical steering tag and address translation between virtual addresses and physical addresses in the memory 104 or cache memory. The steering tag remapping process and the address translation process can be independent functions of the IOMMU and can be performed concurrently. For example, the device 106 generates cache injection memory access requests, including write requests to store data at the cache memory associated with a processor executing a virtual machine having use for the data provided by the device 106. Each memory access request includes a virtual steering tag mapped through an associated physical steering tag to a cache resource (e.g., L4 cache 114; L3 cache 136 or 156; L1 cache 124, 130, 144, or 150; L2 cache 126, 132, 146 or 152) and a memory address indicating a location at the cache resource targeted by the cache injection memory access request. In response to a write request, the resource stores write information of the request at the location corresponding to the memory address of the write request.

Figure 2:
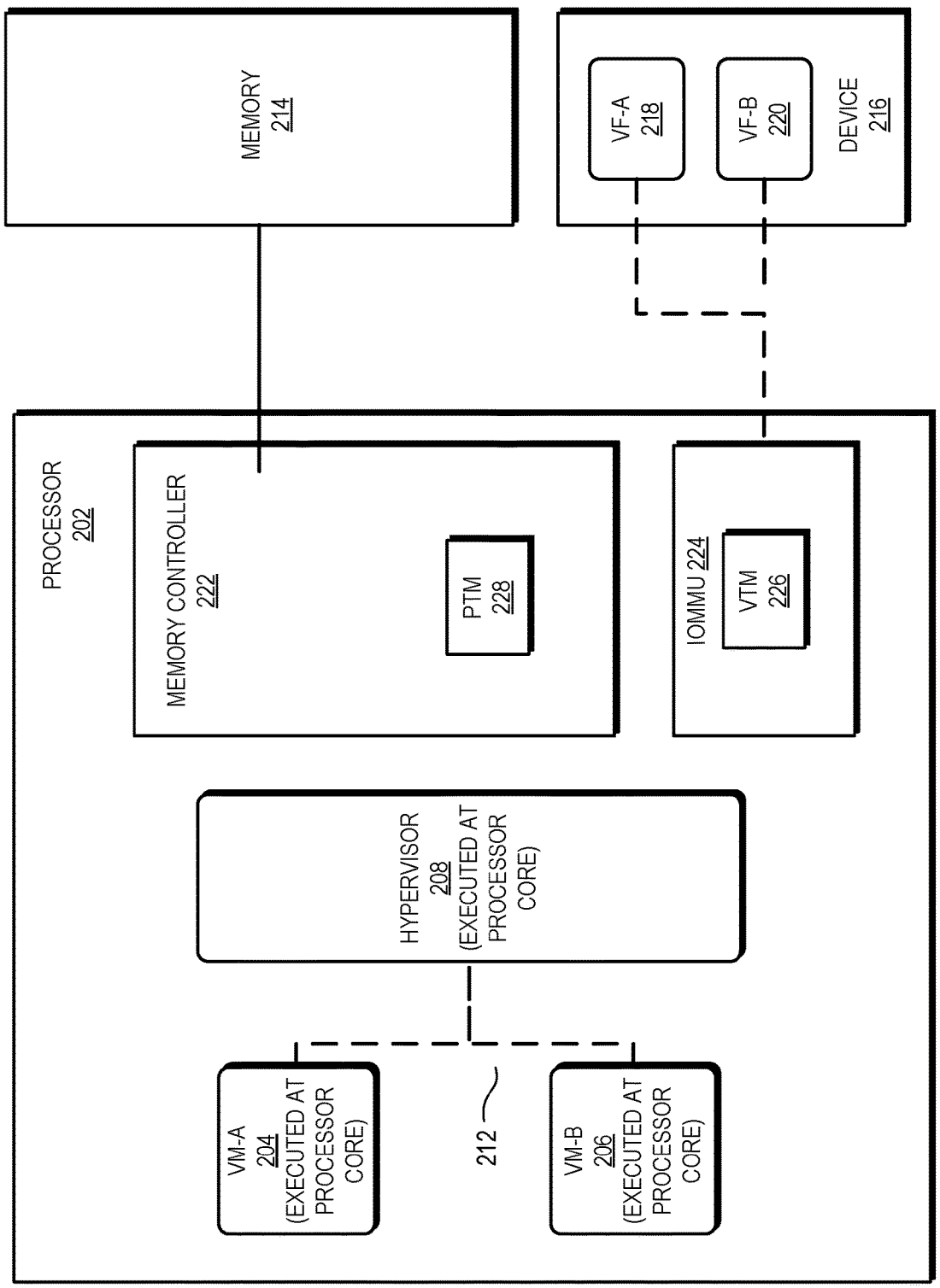
FIG. 2 is a block diagram illustrating an example implementation of the processing system of FIG. 1.

FIG. 2 illustrates, in accordance with some embodiments, an example operation of FIG. 1's processing system 100. The processor 202 is to concurrently execute two virtual machines (VMs), VM-A 204 and VM-B 206. In addition, the processor 202 is to execute a hypervisor 208 to provide an interface between the VMs 204, 206 and the hardware of the processing system. In operation, prior to being permitted to execute at the processor 202, each of the VMs 204 and 206 is assigned virtual steering tags by the hypervisor 208. When the VMs 204 or 206 are assigned processor resources, such as processor core to execute the VM 204 or 206, the hypervisor 208 identifies the physical steering tags associated with the processor resources and generates table entries in a virtual tag map 226 associating the physical steering tags with the virtual steering tags associated with the VM 204 or 206.

The processing system also includes a physical device 216, such as a physical I/O device. The device 216 can be, for example, a network interface card (NIC), a host bus adapter (HBA), or the like. The device 216 can include a plurality of virtual functions (VFs) that are configured on the device. For example, the device 216 includes two VFs, VF-A 218 and VF-B 220, that are configured on the device. The hypervisor 208 maps (e.g., assigns) the VFs 218, 220 to the VMs 204, 206. For example, VF-A 218 is mapped to VM-A 204 and VF-B 220 is mapped to VM-B 206. The hypervisor or the VM can provide the virtual steering tags associated with the VM 204 or 206 to device 216 or to the VF 218 or 220.

The hypervisor 208 generates table entries associating a virtual steering tag and a physical steering tag. The table entries are stored in one or more virtual tag maps 226. In some embodiments, entries for each virtual tag are stored in a single virtual tag map 226. In some embodiments, a virtual tag map can be generated for each virtual machine. In some embodiments, a virtual tag map cab be generated for each device or for each virtual function on each device.

The physical steering tags map to a physical resource, such as a cache memory, such as shared cache or dedicated cache. The mapping from physical steering tag to physical resource is system specific. The processor 202 can store entries in a physical tag map 228 that associates the physical steering tag with a physical resource. Optionally, the physical tag map 228 can be stored and accessed by the memory controller 222. In some embodiments, the virtual steering tag mapping can be place in virtual tag map in a transaction layer packet processing hint (TPH) capability structure in accordance with the PCIe bus standard. If process hints are not used, the physical tag mapping is placed in the transaction layer packet processing hint capability structure. In some embodiments, the physical tag map can be combined with the message signal interrupts (MSI or MSI-X) table. In an example, the map 228 is discoverable by software and each entry is two bytes.

The IOMMU 224 is used to connect devices (such as the device 216) to the memory controller 222. The IOMMU 224 provides an interface for the device 216 to communicate with the memory 214 or cache memory. In an example, the IOMMU 224 communicates with the device 216 in accordance with the PCIe standard. The memory controller 222 receives memory access requests (e.g., direct memory access requests, such as a cache injection memory access request) from the device 216 via IOMMU 224 and controls provision of those requests to the memory 214 or cache memory. In addition, the memory controller 222 receives responses to memory access requests from the memory 214 or cache memory and controls provision of the responses to the device 216. In some embodiments, the hypervisor directs which resources are assigned to execute the virtual machines (e.g., VM-A 204 or VM-B 206) and can change the assignment of resources. For example, the hypervisor 208 can change which processor core or cores implement the virtual machine.

Figure 3:
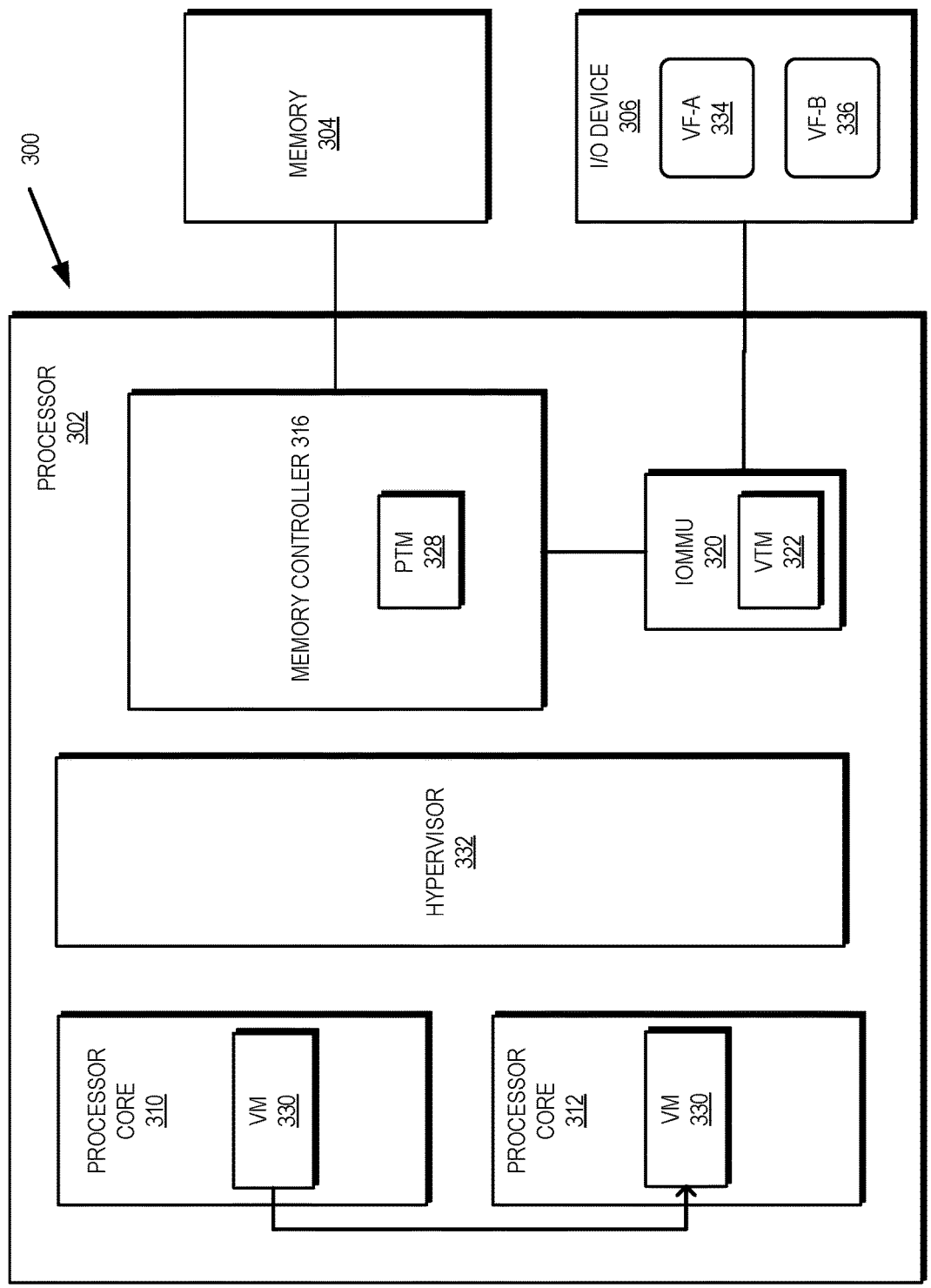
FIG. 3 is a block diagram illustrating an example implementation of the processing system of FIG. 1.

As illustrated in FIG. 3, a system 300 includes a processor 302, memory 304, and an input-output device 306. The processor 302 includes a memory controller 316 in communication with the memory 304. The processor 302 also includes an input-output memory management unit 320 in communication with the input-output device 306. The processor 302 further includes processor cores 310 and 312.

In operation, a hypervisor 332 is implemented on one or more of the processor cores 310 and 312. One function of the hypervisor 332 is to balance the processing load between the processor cores 310 and 312 to ensure efficient operation of the system 300. In some embodiments, the hypervisor 332 can move a virtual machine 330 being implemented on a processor core 310 to a processor core 312. As such, the physical resources being utilized by the virtual machine 330, such as the lower-level cache resources and associated translation lookaside buffers change. The hypervisor 332 updates the virtual tag map 322 at the input-output memory management unit 320 or in memory 304 to change the physical steering tag associated with virtual steering tag associated with the virtual machine 330. The physical tag map 324 remains unchanged because the physical tag is translated into fixed physical resources that are unchanged.

To update the virtual tag map 322, the hypervisor can invalidate an entry. Alternatively, a hypervisor can invalidate a table associated with the virtual machine 330. In some embodiments, the processor core explicitly invalidates entries or a table when the steering tag changes. In some embodiments, the entries or table are invalidated automatically when the entries or tables are modified.

When the input-output device 306 or a virtual function, such as VF-A 334 or VF-B 336, provides a memory access request, such as a cache injection memory access request, to the input-output memory management unit 320, the virtual tag map 322 is utilized to translate the virtual steering tag provided in the memory access request to a physical steering tag. The input-output memory management unit 320 provides the physical steering tag along with the request to the memory controller 316. The memory controller 316 utilizes the physical tag map 324 to determine which resource to access in response to the memory access request. In some embodiments, the physical steering tag maps to higher-level cache shared by the processor cores 310 or 312 or lower-level cache uniquely dedicated for use by one of the processor cores 310 or 312.

In some embodiments, the device 306 provides a prefetch request to the IOMMU 320 requesting a translation or mapping of the virtual steering tag provided to the device 306 or a virtual function (e.g., VF-A 334 or VF-B 306). The device 306 provides the mapped physical steering tag to the IOMMU 320 as part of the cache injection memory access request.

Figure 4:
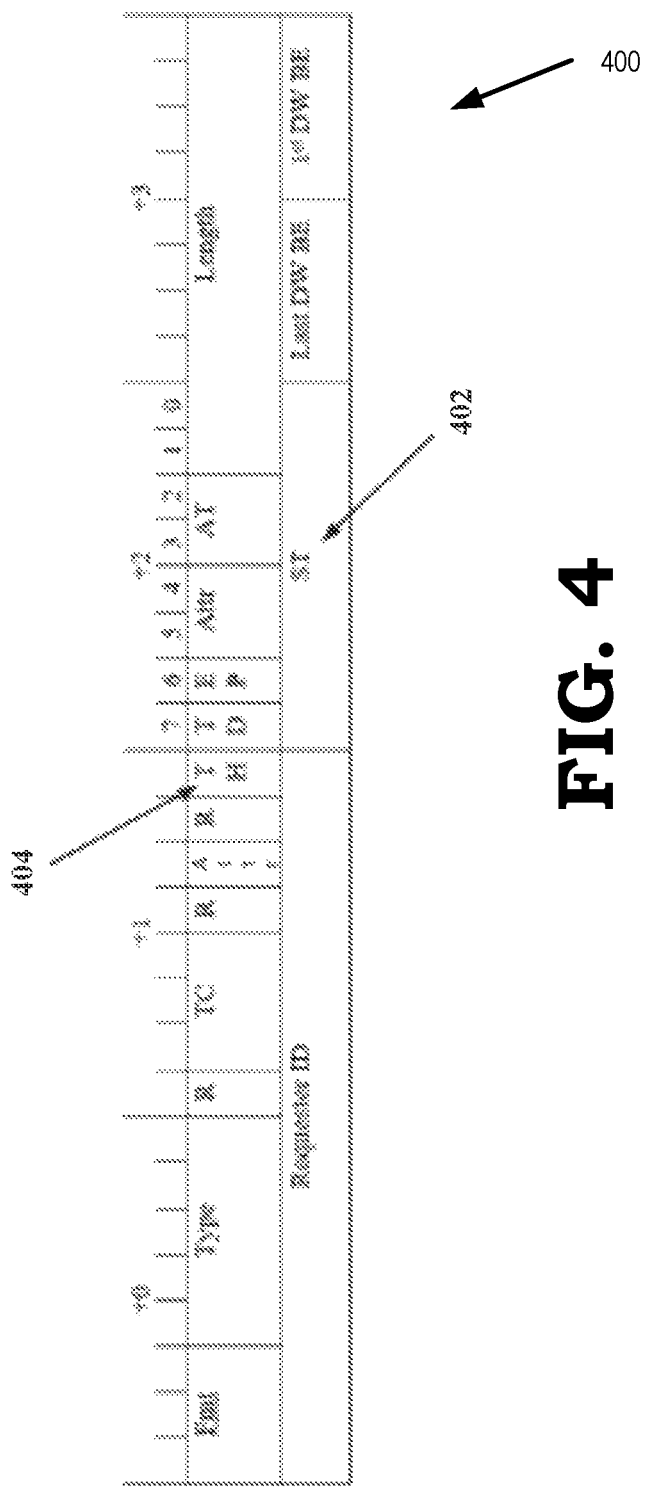
FIG. 4 is a diagram of a portion of a memory access request.

In some embodiments, steering tags are used in accordance with a PCIe bus standard. FIG. 4 is a schematic diagram of a PCIe header 400 with an example steering tag field 402. The PCIe specification defines an extended capability for providing the root complex additional routing indicators. The TLP Processing Hint (TPH) capability includes a Steering Tag (ST) 402 field to direct write data routing (e.g., to non-volatile memory or cache). The TH bit 404 of the header is set to 1 to indicate the header is TPH enabled. FIG. 4 highlights these fields within an example PCIe write header.

TLP Processing Hints can improve memory latency by associating a packet with a given processor cache. The TH bit 404 in the header 400 indicates that hints are present (e.g., a TH bit 404 set to 1 indicates that the header is TPH enabled). In some embodiments, a process hint field (PH) is contained in the last 2 bits of the address field. The 2 hint bits indicate frequent read/write access to data:

i. 00—Bidirectional: by both host and device
ii. 01—Requester: by device
iii. 10—Target (Completer): by host
iv. 11—Target with priority: by host with high temporal locality (using the local cache as much as possible)

Steering Tag (ST) bits 402 are system-specific values that indicate a processing resource is being explicitly targeted by a requester. For posted writes, the 8-bit tag field is repurposed for the ST field 402.

In some embodiments, a PCIe device uses an agreed to set of ST values that the root complex will decode for writes to memory. A PCIe device can use multiple ST values, for example, different ST value for different types of traffic. For example, in a network controller, a set of TCP connections can by processed by one processor thread and another set of TCP connections by another thread. The direct memory access (DMA) writes used by the different connections use different assigned ST values. These ST values can be a predefined fixed value such as FFh or could be a programmed value. The device driver can inquire from the platform that the TPH capability is supported and what ST values to use. The device driver can enable writes and program the ST value for use with any write to memory. In the present system and methods, the steering tag value is a virtual steering tag value that can be mapped to physical steering tag that maps to a physical resource.

In some embodiments, an extended steering tag can be used in the header (e.g., a steering tag that includes an additional 8 bits, for a 16-bit ST). The header can include an additional DWORD in a TLP (e.g., a TLP prefix) that can include 8 additional ST field bits.

Figure 10:
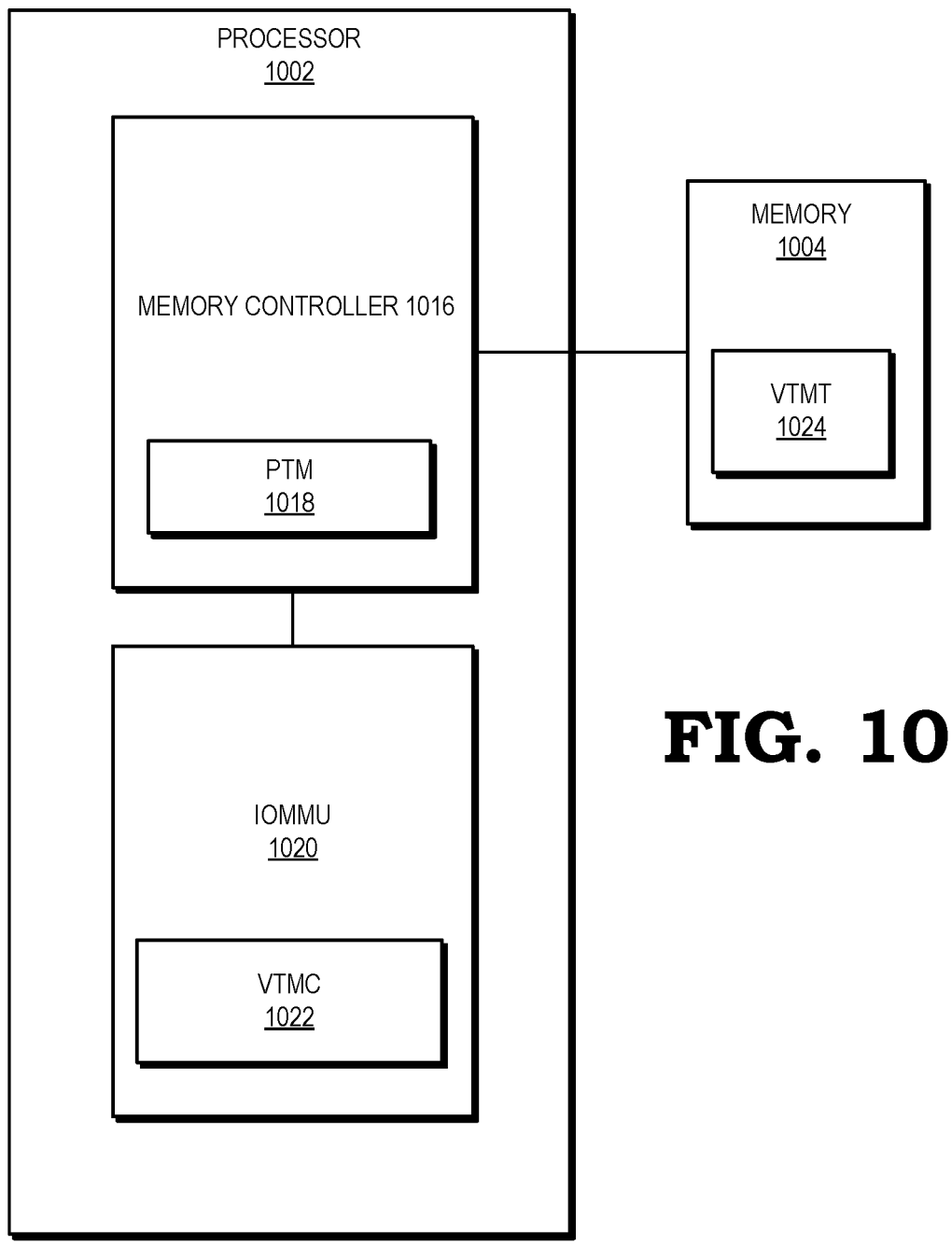
FIG. 10 is a block diagram of a portion of a processor system having a virtual tag map.

The IOMMU can access a virtual tag map to map a virtual steering tag to a physical steering tag. The virtual tag map can be stored in system memory or cached at the IOMMU. For example, FIG. 10 illustrates a portion of a system including a processor 1002 and system memory 1004. The processor 1002 includes a memory controller 1016 and an IOMMU 1020. A virtual tag map table 1024 can be store in system memory 1004. A portion of the virtual tag map 1022 can be cached at the IOMMU 1020. In some embodiment, the IOMMU 1020 can map a virtual steering tag to a physical tag using the virtual tag map 1022 cached at the IOMMU 1020 and when the mapping is not in cache, can walk the virtual tag map tables (VTMT) 1024 stored in system memory 1004. In an example, the cached virtual tag map (VTMC) 1022 reduces delays associated with memory access 1004. In either case, the virtual steering tag is mapped to a physical steering tag that can be mapped to a physical resource, for example, by the memory controller 1016 using a physical tag map 1018.

The mapping of virtual steering tags to physical steering tags can be 1:1. Alternatively, the mapping can be N:1, where multiple virtual steering tags map to the same physical steering tag. For example, when a physical steering tag maps to a shared resource, such as an L3 cache covering cores 0-3, this association can be mirrored into the VM. That is, the VM may have virtual CPUs 0-3, but the virtual CPUs 0-3 may not map onto physical cores sharing the same L3 cache. In some embodiments, virtual CPUs 0-3 are assigned each their own separate virtual steering tag. If the hypervisor maps the virtual CPUs 0-3 onto physical CPU 0-3 then the virtual steering tags referencing an L3 cache can map to the same physical steering tag.

Figure 5:
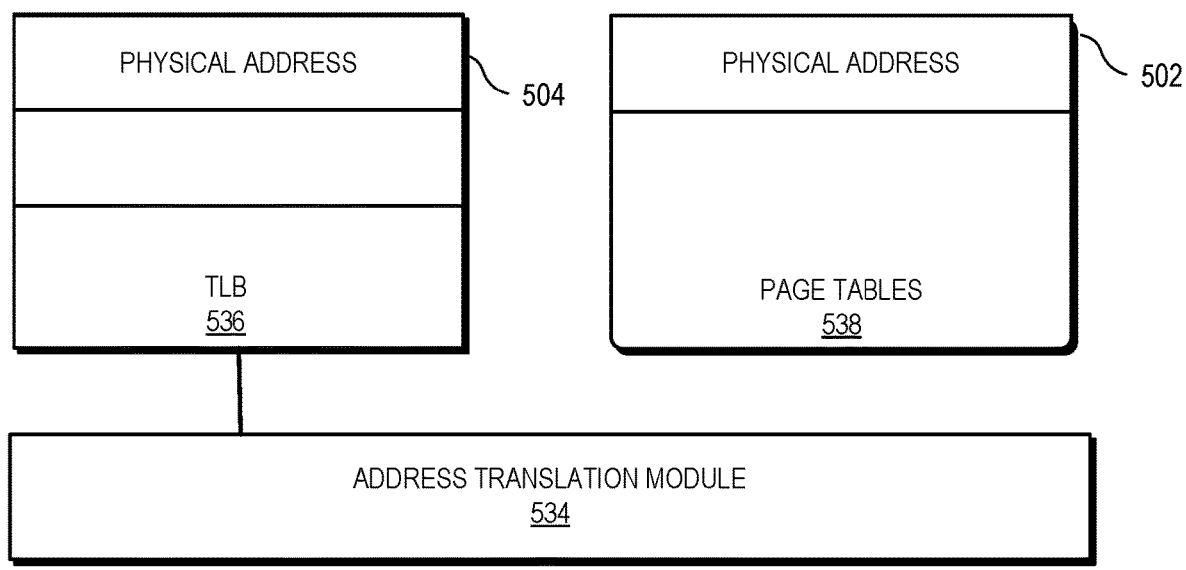
FIG. 5 is a block diagram illustrating the use of a translation lookaside buffer and page tables used to access memory in association with the memory request of FIG. 4.

A memory access request can include a virtual address in addition to the virtual steering tag and, the virtual address of the memory access can be translated. In particular, FIG. 5 depicts an address translation module 534 and a translation lookaside buffer (TLB) 536. The address translation module 534 is generally configured to receive from VFs (e.g., VF-A 324 and VF-B 326 of FIG. 3) virtual addresses for corresponding memory access requests. The address translation module 534 translates each received virtual address to a corresponding physical address that identifies the location of the memory or cache targeted by the memory access request.

The address translation module 534 employs one or both of the TLB 536 and the page tables 538 to translate a virtual address to a corresponding physical address. The page tables 538 include a plurality of entries (e.g., entry 502) indexed by virtual address. In some embodiments, the page tables 538 are multi-level page tables, whereby higher-level pages include entries that identify other pages associated with the virtual address, with the lower level pages identifying the physical address assigned to the virtual address. The physical address can be identified by traversing the page tables in a page walk, wherein the highest-level page is accessed first to identify the page at the next level that is to be accessed, and so on until the lowest level page table that includes the physical address is identified and the physical address retrieved from that highest-level page table.

The TLB 536 includes a plurality of entries (e.g., entry 504) that together store a subset of the entries of the page tables 538 that reflect the virtual addresses recently received by the address translation module 534. In response to receiving a virtual address, the address translation module 534 accesses the TLB 536 to determine whether it includes an entry corresponding to the virtual address.

Figure 6:
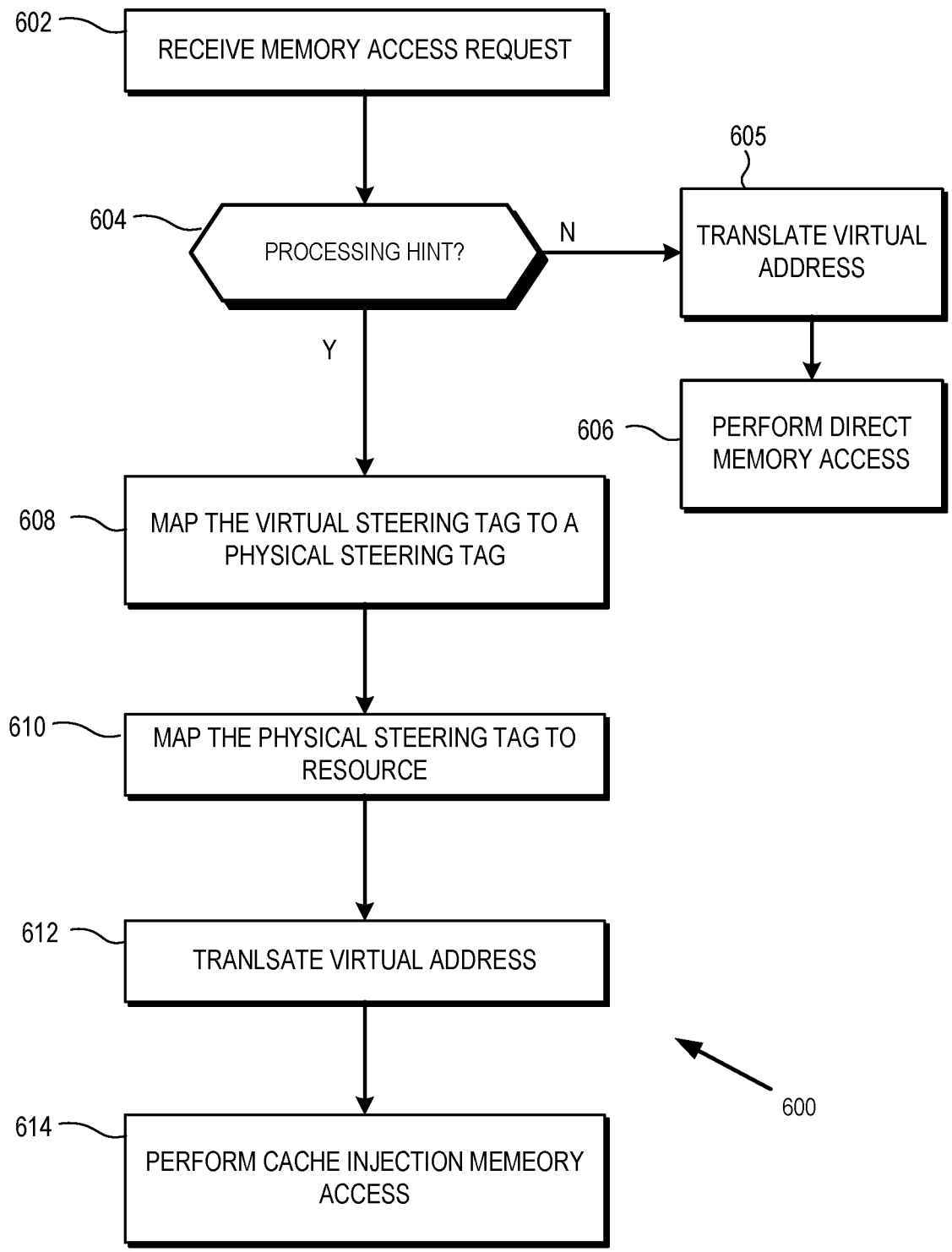
FIG. 6 is a flow diagram of a method of processing memory access request at the processing systems of FIGS. 1-3.

As illustrated in FIG. 6, a method 600 for managing memory access requests begins with receiving a memory access request, such as a cache injection memory access request, at the input-output memory management unit of the processor, as illustrated at block 602. In some embodiments, the memory access request can be a direct memory access request implemented over a bus conforming to a protocol, such as PCIe. Memory access requests can be a read request. In another example, the memory access request can be a write request. In a further example, the memory access request can be an atomic request.

As illustrated at block 604, the memory access request can include a processing hint (TPH) indicating the use of steering tags, for example, in accordance with the PCIe standard. When the TPH indicates no, the memory controller can be signaled to perform a direct memory access in accordance with conventional protocols. For example, an address can be translated, as illustrated at block 605. The memory controller performs the memory access request, such as a cache injection memory access request, as illustrated at block 606.

When the processing hint indicates yes, the virtual steering tag provided by the device, optionally implementing a virtual function, is translated to a physical steering tag by the IOMMU using a virtual tag map, as illustrated at block 608. The virtual tag map can be fetched from memory by the IOMMU or can be locally cached inside the IOMMU. The virtual tag map associates the virtual steering tag with a physical steering tag indicative of a physical resource targeted by the memory access request. The virtual steering tag can be replaced with the physical steering tag of the memory access request and the request sent to the memory controller.

As illustrated at block 610, the physical steering tag can be mapped to a resource by the memory controller. For example, the memory controller can utilize the physical steering tag to identify a physical resource using the physical tag map. The resource can be long-term memory, high-level cache shared by multiple processing cores, or lower-level cache exclusively dedicated for use by a processor core. In some embodiments, the physical steering tag maps to lower-level cache uniquely associated with a processor core.

As illustrated at block 612, the memory access request can include a virtual address that is translated, for example, by the IOMMU. The IOMMU can access page tables or translation lookaside buffers to translate the virtual address to a physical address, for example, as illustrated at FIG. 5. While block 612 is positioned after blocks 604 and 608, the virtual address can be translated in parallel to the mapping of the virtual steering tag. Alternatively, the virtual address can be translated prior to mapping the virtual address. In particular, the process of translating the virtual address is orthogonal to the mapping of the steering tag and can be performed before, during, or after the mapping of the virtual tag.

The memory access request can be forwarded to the memory controller along with the translated address and the physical steering tag. In an example, the physical steering tag is associated with a cache memory associated with a processor core, such as a lower-level cache. The cache injection memory access can be performed in the lower-level cache referenced by the physical steering tag, as illustrated at block 614. In some embodiments, the cache can be tagged with the physical address. The cache line will be marked as Modified to indicate that it contains data that is newer than what is located at the corresponding physical address in system memory. In some embodiment, the processor cache can obtain ownership of the line using a cache coherency protocol relevant to the implementation such that the processor can safely write the DMA data into the cache.

With such a method, direct memory access between a virtual machine and a device or virtual function implemented on the device can be implemented in a virtualized and load balanced system in which the virtual machine may be allocated and reallocated resources, including one or more processor cores and associated cache resources, depending on resource availability and usage, For example, the virtual machine can be moved between resources within the physical system by the hypervisor. In an illustrative example, a virtual machine can be moved from executing on physical processor core 0 to physical processor core 1.

Figure 7:
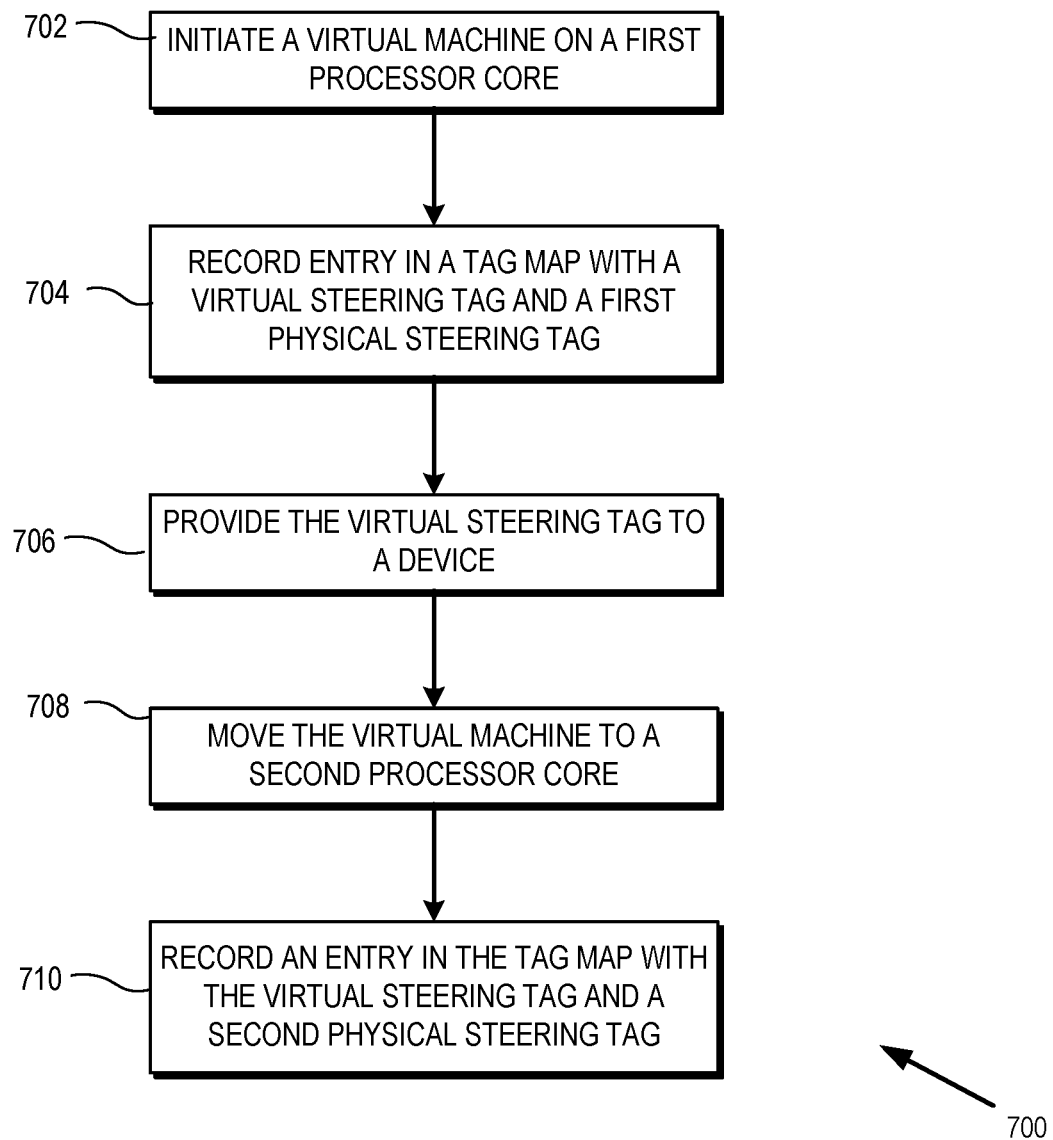
FIG. 7 is a flow diagram of a method of processing memory access request at the processing system of FIGS. 1-3.

FIG. 7 illustrates a method 700 of managing memory access in a system in which virtual machines may be reallocated to different resources. As illustrated at block 702, a hypervisor initiates a virtual machine on a processor core. The processor core can include lower-level cache uniquely associated with the processor core. In addition, the processor can access higher-level caches that are shared among multiple processor cores and long-term memory. The memory access can be managed by a memory controller. Further, the virtual machine can seek to access an input-output device or virtual functions implemented on such an input-output device.

The hypervisor can record an entry in a virtual tag map. The entry can include a virtual steering tag associated with a physical steering tag mapped to resources accessible to the processor core. In an example, the physical steering tag can point to lower-level cache resources associated with the processor core, as illustrated at block 704.

The hypervisor or a virtual machine can provide the virtual steering tag to the device, as illustrated at block 706. In an example, the hypervisor can program the virtual steering tags into the processes of the device through virtual ACP tables. When the device communicates with the input-output memory management unit with a direct memory access request, the direct memory access request can include the virtual steering tag indicating a virtual resource the device is attempting to access. For example, memory access can be provided using a method such as the method illustrated in FIG. 6.

In some embodiments, the hypervisor balances processor load between processor cores in a multiprocessor core system. As illustrated at block 708, the hypervisor can move or reallocate the virtual machine to a second processor core and away from the first processor core. The second processor core can further include lower-level cache uniquely associated with the second processor core with a different physical steering tag than the resources of the first processor core. The virtual steering tag remains unchanged. As such, no further information is to be exchanged with the device or virtual function implemented on the device regarding the new or revised virtual steering tag. Nevertheless, the physical resources implementing the virtual machine changed, and thus the physical steering tag is changed. While this process is described with respect to single processor cores, the virtual machine may be executed on more than one processor core. A similar principle applies when additional processing resources are allocated for use by the virtual machine, the number of processor resources allocated to execute the virtual machine is reduced, or a processor core of the more than one processor cores is replaced by a different processor core.

As illustrated at block 710, the hypervisor can record an entry in the virtual tag map. The entry can include the virtual steering tag and a second physical steering tag. The previous entry or table in which the previous entry was stored can be invalidated either explicitly by the processor core or automatically in response to a change in the table. In an example, the hypervisor can flush the cached virtual tag map at the IOMMU.

In some embodiments, a hypervisor can manage mapping of virtual steering tags, while a virtual machine initiated and managed by the hypervisor can communicate with a device. FIG. 8 includes a flow diagram illustrating a method 800 for managing a virtual machine using a hypervisor. As illustrated at block 802, the hypervisor writes virtual Advanced Configuration and Power Interface (ACPI) tables. In addition, the hypervisor assigns a range of virtual tags and writes an initial virtual to physical steering tag mapping, as illustrated at block 804. Such a mapping can be stored in system memory or a portion can be cached at the IOMMU.

As illustrated at block 806, the hypervisor can boot a virtual machine using a first processor core and having the initial mapping. The hypervisor can monitor performance of the system and seek to balance use of system resources. For example, as illustrated at block 808, the hypervisor can move the virtual machine to a second processor core, changing the physical resources and thus, the physical steering tags of the processor core executing the virtual machine. The hypervisor can modify the virtual to physical steering tag mapping, as illustrated at block 810. Optionally, modifying includes updating maps in the system memory and invalidating cached copies at the IOMMU.

In some embodiment, the virtual machine accesses the APCI tables and provides the virtual steering tags to the device. As illustrated in FIG. 9, a method 900 for managing devices using a virtual machine includes reading the virtual ACPI tables prepared by the hypervisor, as illustrated at block 902. The virtual machine can load the device drivers, as illustrated at block 904, and can communicate the virtual steering tags to the devices, as illustrated at block 906.

Figure 11:
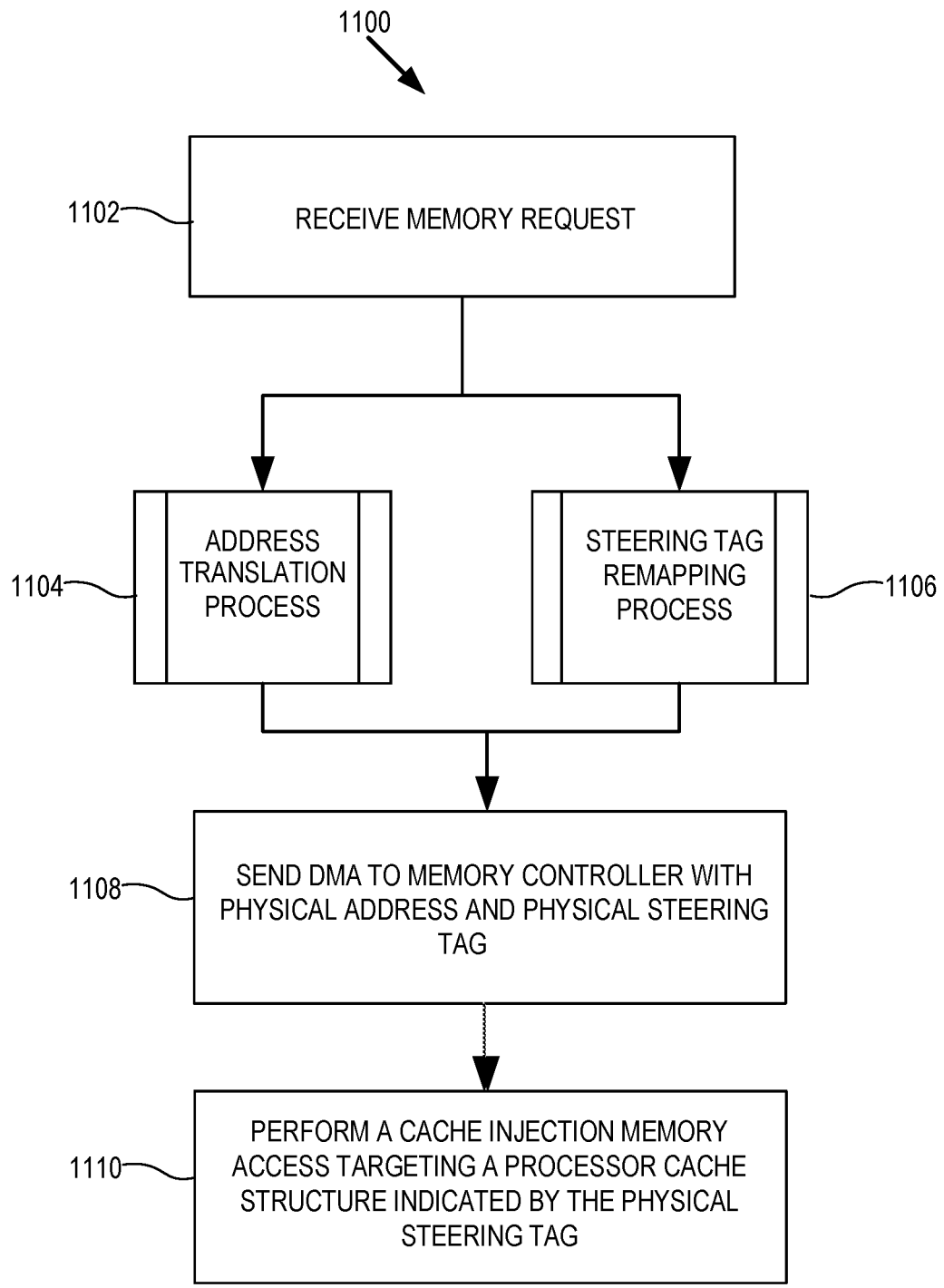
FIG. 11 is a flow diagram of a method for processing a memory access request by the processing system of FIGS. 1-3.

FIG. 11 is a flow diagram of an example method for processing a memory access request. The method 1100 includes receiving a memory access request, for example at the IOMMU, as illustrated at block 1102. The memory access request can include a virtual address and a virtual steering tag.

The virtual address can be translated through an address translation process, as illustrated at block 1104. For example, the virtual address can be translated using a translation lookaside buffer or alternatively by walking a page table.

In addition, the virtual steering tag can be translated using a steering tag remapping process, as illustrated at block 1106. The address translation process and the steering tag remapping process can occur simultaneously or concurrently, for example, in parallel. In particular, the steering tag remapping process can include looking up a steering tag remapping cache or walking a remapping table.

As illustrated at block 1108, the direct memory access can be sent to a memory controller with the physical address and physical steering tag translated through the address translation process and steering tag remapping process. As illustrated at block 1110, the processor can perform a cache injection memory access targeting a processor cache structure indicated by the physical steering tag.

Figure 12:
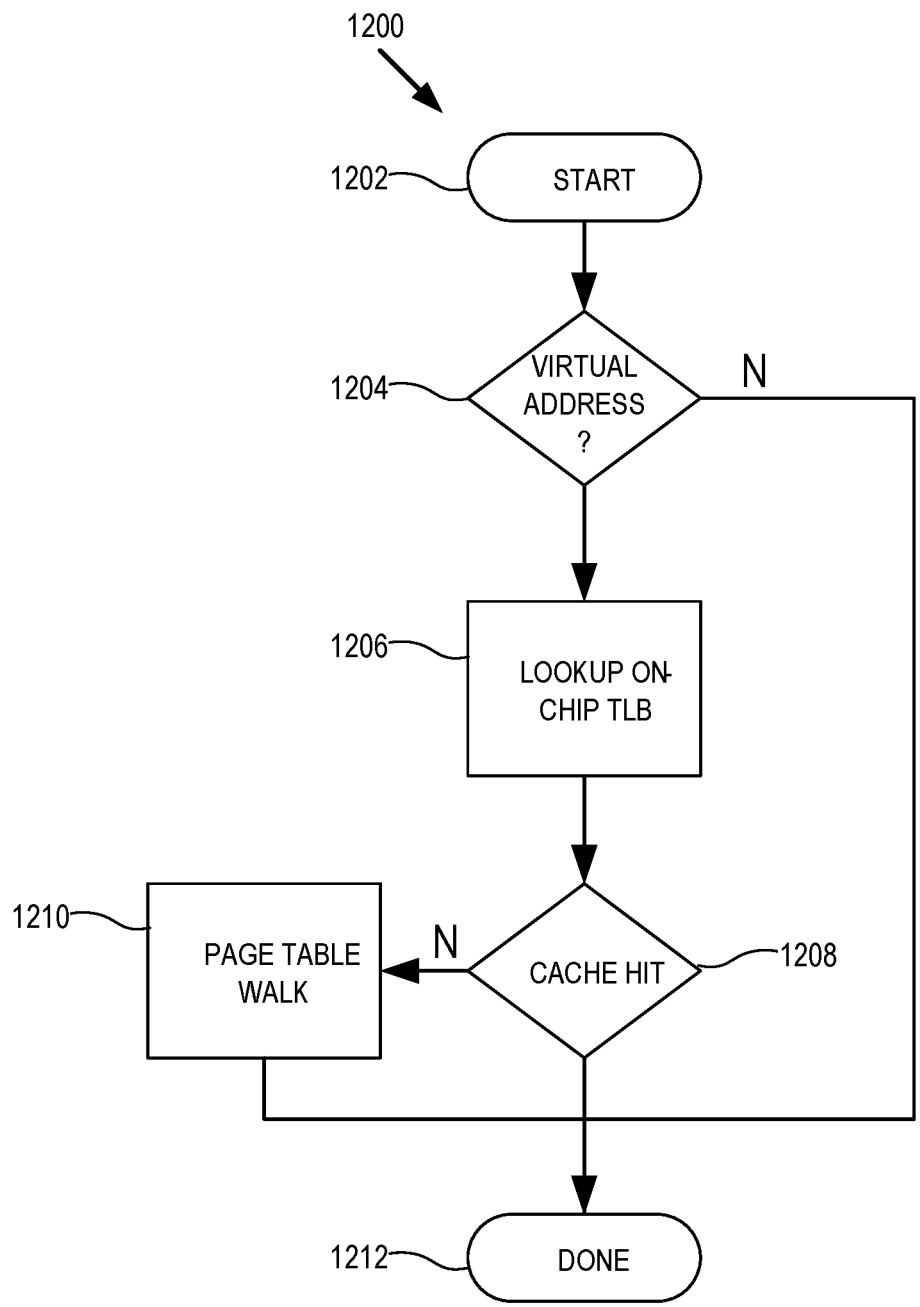
FIG. 12 is a flow diagram of a method for translating an address at the processing system of FIGS. 1-3.

FIG. 12 is a flow diagram illustrating an example method 1200 for processing an address translation, for example, block 1104 of FIG. 11. The process starts at block 1202. As illustrated at block 1204, the system determines whether the memory access request includes a virtual address. If the memory access does not include a virtual address, the process is completed, as illustrated at block 1212.

In the event that a virtual address is present, the system can look up a translation of the virtual address on an on-chip translation lookaside buffer, as illustrated at block 1206. If there is not a cache hit, as illustrated at block 1208, the system can walk the page tables, as illustrated at block 1210. If there is a cache hit, the process is completed at block 1212.

Figure 13:
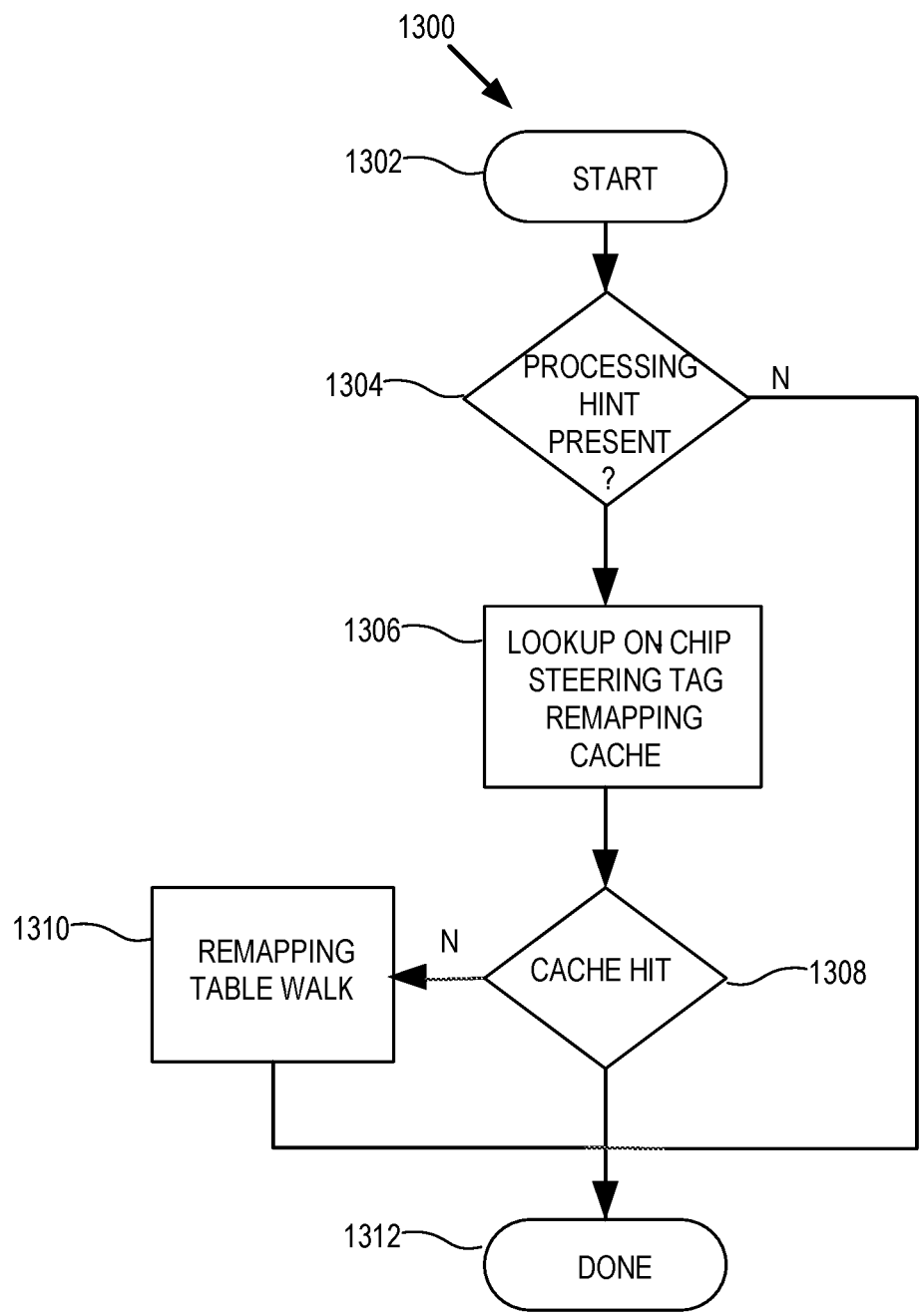
FIG. 13 is a flow diagram of a method for translating a steering tag at the processing system of FIGS. 1-3.

An example steering tag mapping process, for example block 1106 of FIG. 11 is illustrated in FIG. 13. The method 1300 starts at block 1302. The system can determine whether a processing hint is present, as illustrated at block 1304. The processing hint can, for example, indicate the presence of a virtual steering tag. In the event that a processing hint indicates no virtual steering tag, the process can be complete, as illustrated at block 1312. When a processing hint indicates that a virtual steering tag is present, the system can look up an on-chip steering tag remapping cache, as illustrated at block 1306, in search of the translation of the virtual steering tag.

In the event there is a cache hit, as illustrated at block 1308, the process can be completed as illustrated at block 1312. In the event that no cache hit is achieved, at block 1308, the system can walk a remapping table, as illustrated at block 1310.

Figure 14:
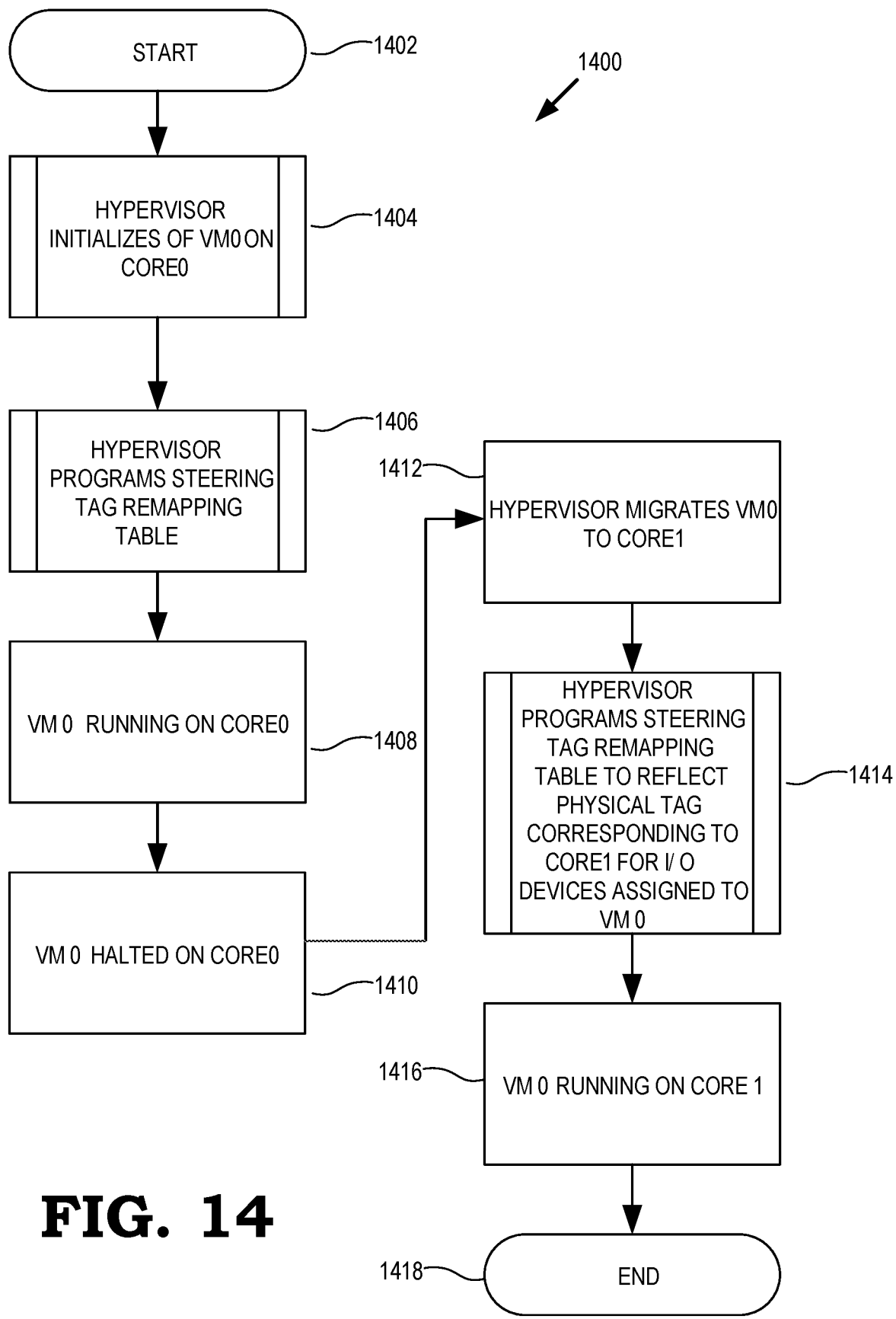
FIG. 14 is a flow diagram of a method for managing processor resource with a hypervisor at the processing system of FIGS. 1-3.

When managing virtual machines on a multiprocessor core system, a hypervisor can manage a virtual tag map as different processor resources are allocated to a virtual machine. FIG. 14 illustrates a method 1400 for managing a virtual tag map, such as a steering tag remapping table. The process starts at block 1402.

The hypervisor initializes the first virtual machine (VMO) on a core of the processor (core0), as illustrated at block 1404. The hypervisor programs the steering tag remapping table, as illustrated at block 1406, to include a mapping of virtual steering tags to physical steering tags based on the initialization of the virtual machine on the specified core. As a result, the virtual machine (VMO) is running on the assignment processor core (core)), as illustrated at block 1408.

In some embodiments, the virtual machine can be halted, as illustrated at block 1410. For example, the virtual machine (VMO) can be halted on the core (core0). The hypervisor can then migrate the virtual machine to a different core, as illustrated at block 1412. For example, hypervisor can migrate VMO to core1.

As illustrated at block 1414, the hypervisor programs the steering tag remapping table to reflect the updated physical tags corresponding to core1 for input-output devices assigned to the virtual machine (VMO). The virtual machine (VMO) runs on the newly assigned core (core1), as illustrated at 1416. The process can be completed, as illustrated at block 1418.

Figure 15:
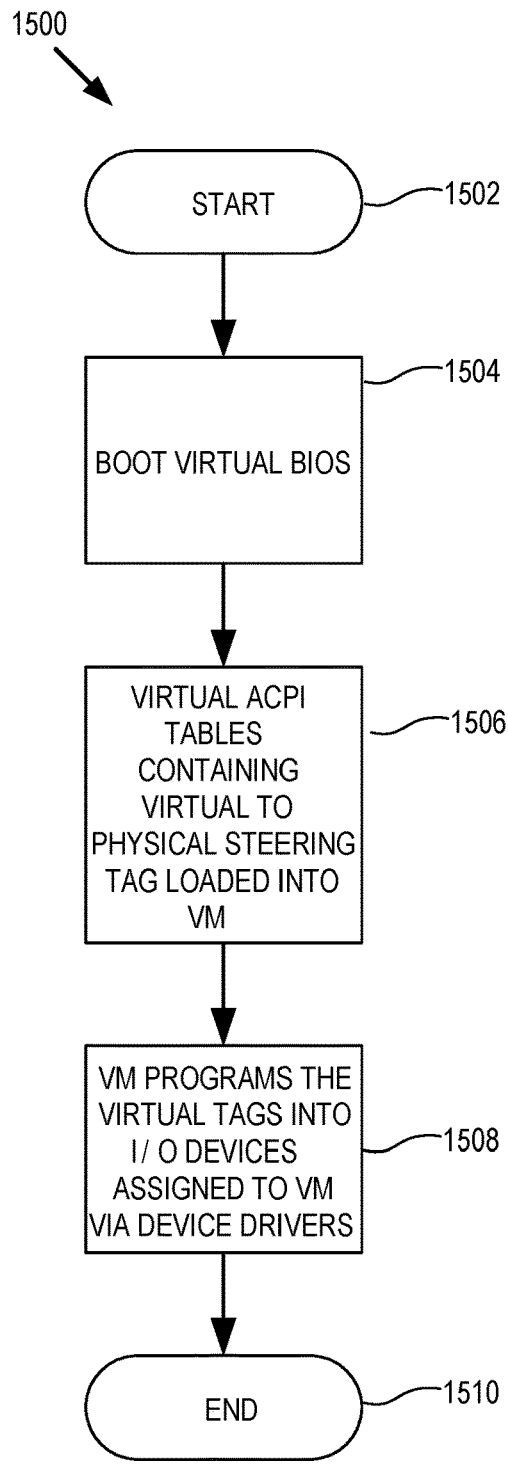
FIG. 15 is a flow diagram of a method for initializing a virtual machine at the processing system of FIGS. 1-3.

As the virtual machine is initialized under the management of the hypervisor, the virtual machine can provide virtual tags to input-output devices. For example, FIG. 15 illustrates a method 1500 that starts at block 1502.

A virtual bios can be booted, as illustrated at block 1504. Virtual ACPI tables containing virtual to physical steering tag can be loaded into the virtual machine, as illustrated at block 1506. The virtual machine can then program the virtual tags into the input-output devices assigned to the virtual machine by device drivers, as illustrated at block 1508, and the process can end, as illustrated at block 1510.

Figure 16:
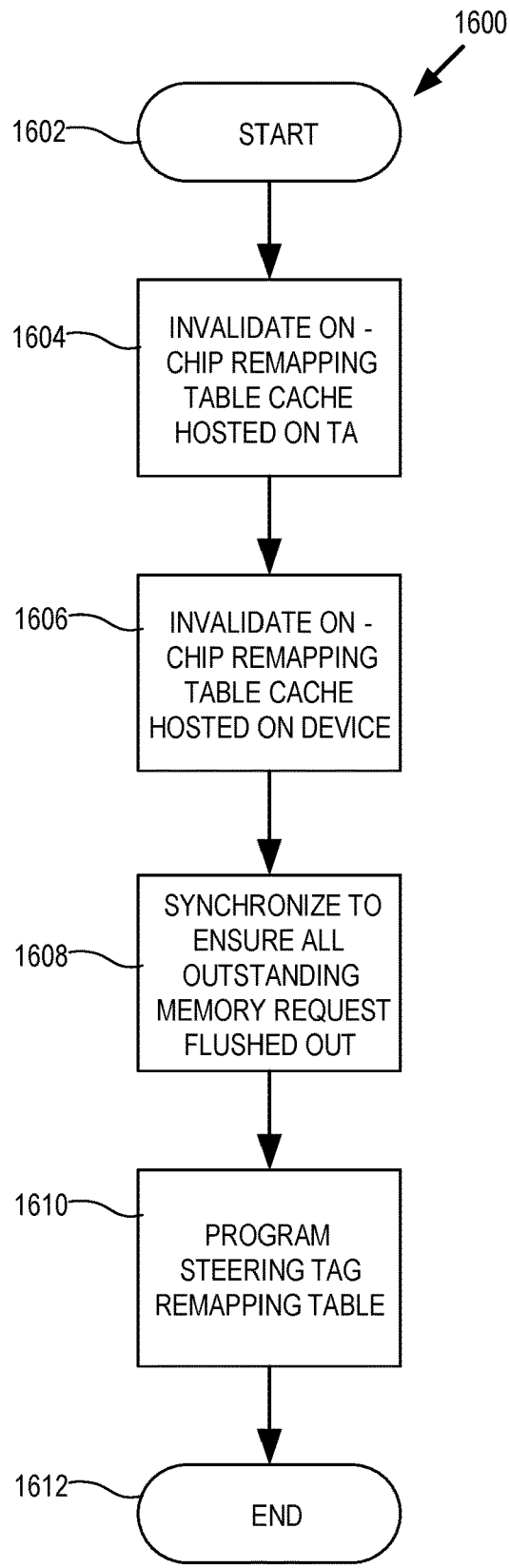
FIG. 16 is a flow diagram of a method for updating steering tag maps at the processing system of FIGS. 1-3.

When the hypervisor changes the assigned processor, resources utilized by a virtual machine, the steering tag remapping tables can be reprogrammed. For example, FIG. 16 illustrates a method 1600 that begins at block 1602. As illustrated at block 1604, the system can invalidate on-chip remapping tables cache hosted on TA. In addition, on-chip remapping table cache hosted on a device can be invalidated, as illustrated at block 1606.

As illustrated at block 1608, the system can be synchronized to ensure all outstanding memory requests are flushed out. As illustrated at block 1610, the steering tag remapping table can be programmed. The process can end, as illustrated at block 1612.

Figure 17:
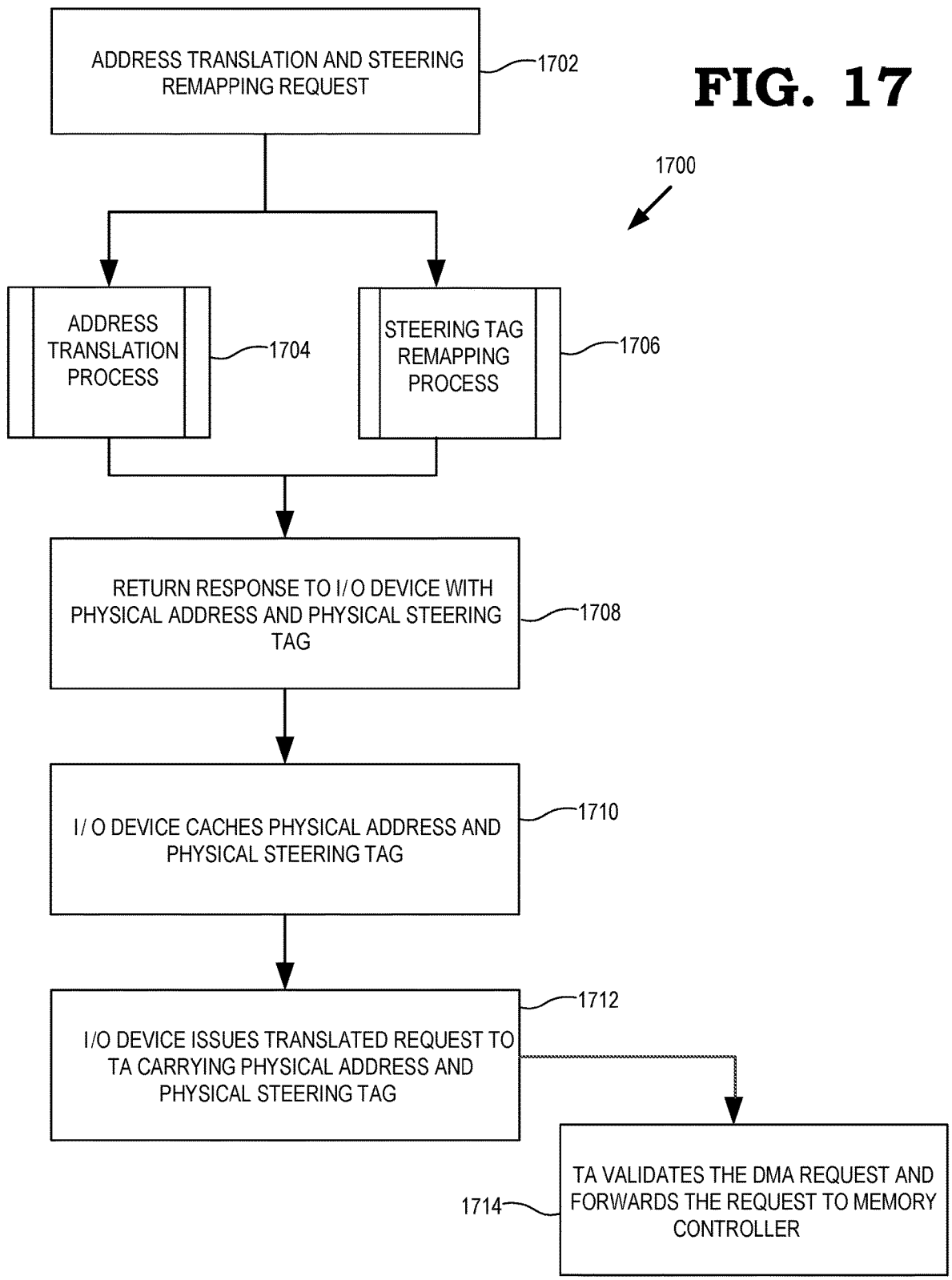
FIG. 17 and FIG. 18 are a flow diagram for managing address translation and steering tag mapping at the processing system of FIGS. 1-3.

In some embodiments, the input output device can cache both address translation and steering tag remapping. FIG. 17 illustrates an exemplary example method 1700. The input-output device can request address translation and steering remapping, as illustrated at block 1702. Processor resources, such as an input-output memory management unit, can perform the address translation process and steering tag remapping process. For example, the address translation process of FIG. 12 can be performed, as illustrated at block 1704. Similarly, the steering tag remapping process, as illustrated at block 1706, can be performed. An example steering tag remapping process is illustrated in FIG. 13. The steering tag remapping process can be performed simultaneously, concurrently, or in parallel with the address translation process.

As illustrated in block 1708, a response can be returned to the input-output device with the physical address and steering physical steering tag. The input-output device then caches the physical address and the physical steering tag, as illustrated at block 1710, and the input-output device issues the translated request caring the physical address and the physical steering tag to the TA, as illustrated at block 1712. The TA validates the direct memory access request and forwards the request to the memory controller, as illustrated at 1714.

Figure 18:
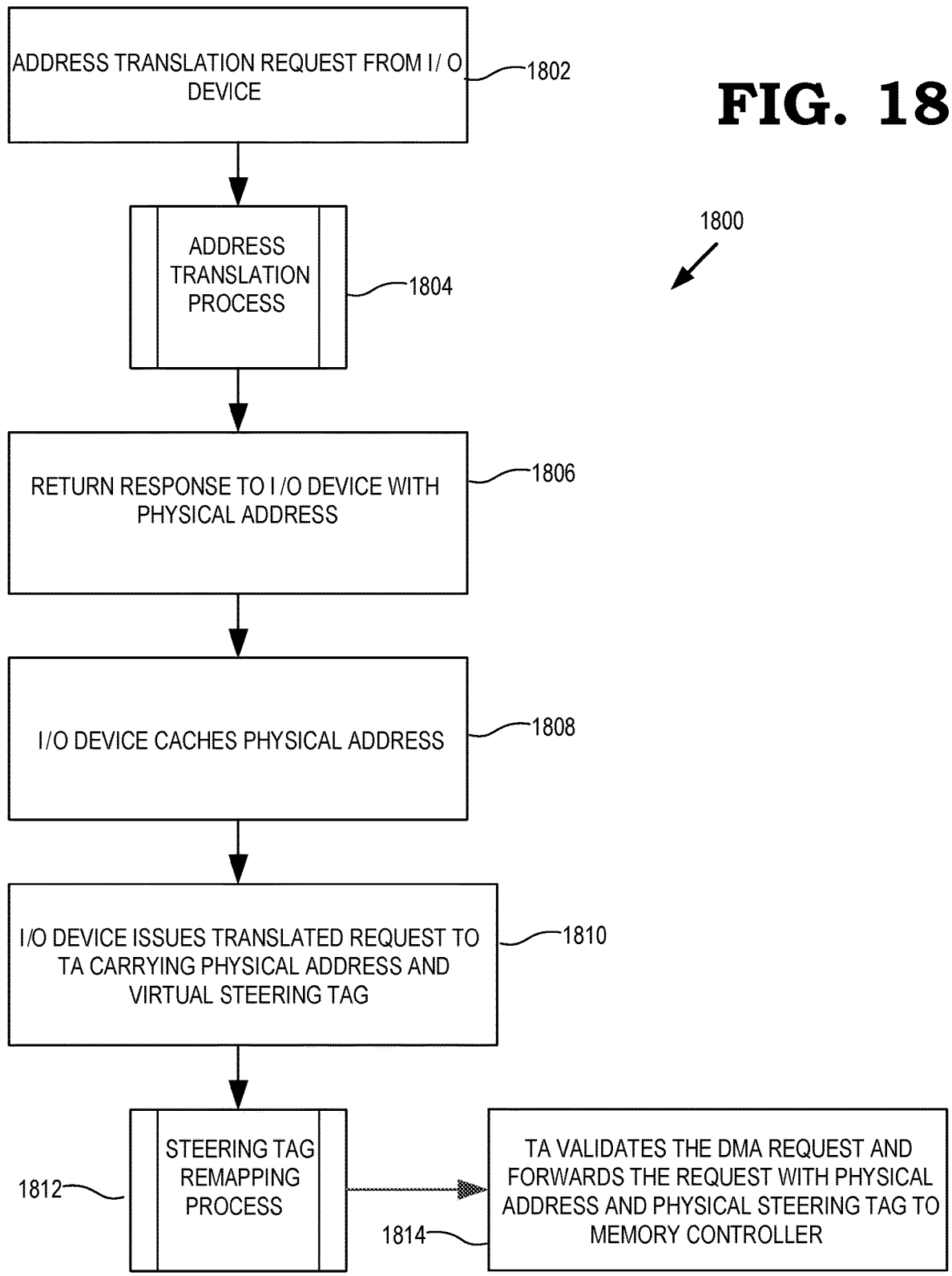

In an alternative embodiment, the input-output device may have an address translation cache and may not have a steering tag remapping cash. For example, as illustrated in FIG. 18, a method 1800 includes sending an address translation request from the input-output device, as illustrated block 1802.

As illustrated at block 1804, the processor can perform an address translation process, for example illustrated in FIG. 12. In response, the processor can return the physical address to the input-output device, as illustrated at 1806. The input-output device caches the physical address, as illustrated at block 1808.

As illustrated at block 1810, the input-output device issues a translated memory access request carrying the physical address and the virtual steering tag. The processor can perform steering tag remapping, as illustrated at block 1812. An example processor tag remapping process is illustrated in FIG. 13.

The processor validates the direct memory access request and forwards the request with the physical address and the physical steering tag to a memory controller, as illustrated at block 1814.

After reading the specification, skilled artisans will appreciate that certain features are, for clarity, described herein in the context of separate embodiments, may also be provided in combination in a single embodiment. Conversely, various features that are, for brevity, described in the context of a single embodiment, may also be provided separately or in any subcombination. Further, references to values stated in ranges include each and every value within that range.

In some embodiments, the apparatus and techniques described above are implemented in a system having one or more integrated circuit (IC) devices (also referred to as integrated circuit packages or microchips), such as the processor described above with reference to FIGS. 1-5. Electronic design automation (EDA) and computer aided design (CAD) software tools may be used in the design and fabrication of these IC devices. These design tools typically are represented as one or more software programs. The one or more software programs include code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a non-transitory computer readable storage medium accessible to the computing system. Likewise, the code representative of one or more phases of the design or fabrication of an IC device may be stored in and accessed from the same computer readable storage medium or a different computer readable storage medium.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method of managing memory access, the method comprising:
   receiving, at an input output memory management unit, a memory access request from a device, the memory access request including a memory address and a virtual steering tag associated with a virtual machine, the virtual steering tag different from the memory address;
   translating the virtual steering tag to a physical steering tag directing cache injection memory access of a cache memory associated with a processor core of a plurality of processor cores, the virtual machine implemented on the processor core; and
   accessing the cache memory to implement the memory access request based on the memory address.

2. The method of claim 1, wherein translating the virtual steering tag includes translation with the input output memory management unit.

3. The method of claim 1, wherein translating the virtual steering tag includes accessing a tag map.

4. The method of claim 3, further comprising:
   assigning the virtual steering tag, wherein the virtual steering tag is assigned by a hypervisor managing the virtual machine; and
   generating an entry in the tag map associating the virtual steering tag with the physical steering tag.

5. The method of claim 4, further comprising:
   implementing, with the hypervisor, the virtual machine on a second processor core of the plurality of processor cores; and updating the tag map to associate the virtual steering tag with a second physical steering tag directing memory access of a cache memory associated with the second processor core.

6. The method of claim 5, further comprising:
implementing, with the hypervisor, a second virtual machine on the processor core of the plurality of processor cores; and
assigning, with the hypervisor, a second virtual steering tag to the second virtual machine.

7. The method of claim 4, further comprising providing the virtual steering tag to the device.

8. The method of claim 4, wherein the virtual steering tag is assigned based on the virtual machine.

9. The method of claim 1, wherein memory access to the cache memory of the processor core of the plurality of processor cores is managed by a memory controller.

10. The method of claim 9, wherein the processor core includes an associated translation lookaside buffer, wherein the memory access request further includes a virtual address, the method further comprising translating the virtual address.

11. A method of managing memory access to a virtual machine implemented on a processor core of a plurality of processor cores, the method comprising:
instantiating with a hypervisor a virtual machine on a first processor core of a plurality of processor cores;
recording an entry into a tag map, the entry pairing a physical steering tag associated with the first processor core and a virtual steering tag associated with the virtual machine, the tag map accessible by an input output memory management unit associated with the plurality of processor cores; and
providing the virtual steering tag to a device having access to the input output memory management unit.

12. The method of claim 11, further comprising:
moving the virtual machine from the first processor core to a second processor core of the plurality of processor cores; and
in response to the moving, recording a second entry in the tag map, the second entry pairing a second physical steering tag with the virtual steering tag.

13. The method of claim 12, further comprising removing the entry.

14. The method of claim 11, further comprising:
receiving, at the input output memory management unit, a memory access request from the device, the memory access request including the virtual steering tag;
translating the virtual steering tag to the physical steering tag directing cache injection memory access of a cache memory associated with the first processor core; and
accessing the cache memory to implement the memory access request.

15. The method of claim 14, wherein the cache memory is uniquely dedicated for use by the first processor core.

16. The method of claim 14, wherein the virtual steering tag is assigned based on the virtual machine.

17. The method of claim 14, wherein the cache memory is a level 1 processor cache.

18. A system comprising:
a plurality of processor cores, each processor core having a dedicated cache memory;
a memory controller to access the dedicated cache memory;
an input-output memory management unit in communication with the memory controller, the input-output memory management unit having access to a tag map associating a virtual steering tag with a physical steering tag; and
a device in communication with the input-output memory management unit, the device to provide a memory access request to the input-output memory management unit, the memory access request including a virtual steering tag and a memory address different from the virtual steering tag, the input-output memory management unit to translate the virtual steering tag to a physical steering tag associated with the dedicated cache memory of each of the plurality of processor cores.

19. The system of claim 18, further comprising a physical tag map associating the physical steering tag with the dedicated cache memory.

20. The system of claim 18, further comprising a translation lookaside buffer, the memory access request including a virtual address, the translation lookaside buffer to translate the virtual address to a physical address in the dedicated cache memory.

* * * * *